(12) United States Patent
Hui et al.

(10) Patent No.: US 9,430,738 B1
(45) Date of Patent: Aug. 30, 2016

(54) AUTOMATED EMOTIONAL CLUSTERING OF SOCIAL MEDIA CONVERSATIONS

(71) Applicant: Mashwork, Inc., New York, NY (US)

(72) Inventors: Ka-Chuen Sam Hui, Jersey City, NJ (US); Jared Adam Feldman, Warren, NJ (US)

(73) Assignee: MASHWORK, INC., New York, NY (US)

( * ) Notice: Subject to any disclaimer, the term of this patent is extended or adjusted under 35 U.S.C. 154(b) by 122 days.

(21) Appl. No.: 13/762,900

(22) Filed: Feb. 8, 2013

Related U.S. Application Data

(60) Provisional application No. 61/596,481, filed on Feb. 8, 2012.

(51) Int. Cl.
*G06N 5/02* (2006.01)
*G06N 99/00* (2010.01)

(52) U.S. Cl.
CPC .............. *G06N 5/022* (2013.01); *G06N 99/00* (2013.01)

(58) Field of Classification Search
CPC .................... G06N 5/022; G06N 99/00
See application file for complete search history.

(56) References Cited

U.S. PATENT DOCUMENTS

| | | | |
|---|---|---|---|
| 5,371,673 A | 12/1994 | Fan | |
| 7,043,760 B2 | 5/2006 | Holtzman et al. | |
| 7,165,023 B2 | 1/2007 | Corman et al. | |
| 7,167,910 B2 | 1/2007 | Farnham et al. | |
| 7,177,880 B2 | 2/2007 | Ruvolo et al. | |
| 7,185,065 B1 | 2/2007 | Holtzman et al. | |
| 7,197,470 B1 | 3/2007 | Arnett et al. | |
| 7,975,983 B2 | 7/2011 | Comeaux et al. | |
| 7,987,188 B2 * | 7/2011 | Neylon ............. | G06F 17/30616 706/12 |
| 8,112,301 B2 | 2/2012 | Harvey et al. | |
| 8,166,032 B2 * | 4/2012 | Sommer ............. | G06F 17/3071 707/736 |
| 8,605,996 B2 * | 12/2013 | Ni ....................... | G06F 17/2785 382/159 |
| 2003/0154248 A1 | 8/2003 | Smith et al. | |
| 2006/0042483 A1 | 3/2006 | Work et al. | |
| 2006/0064431 A1 | 3/2006 | Kishore et al. | |
| 2006/0173957 A1 | 8/2006 | Robinson et al. | |
| 2006/0190809 A1 * | 8/2006 | Hejnal, Jr. ................. | 715/500.1 |
| 2006/0200434 A1 | 9/2006 | Flinn et al. | |
| 2006/0277465 A1 * | 12/2006 | Pandit ................... | G06F 17/277 715/234 |

(Continued)

FOREIGN PATENT DOCUMENTS

| | | |
|---|---|---|
| WO | WO-2008-112944 | 9/2008 |
| WO | WO-2010-001406 | 1/2010 |
| WO | WO-2011-133881 | 10/2011 |

OTHER PUBLICATIONS

"Spell Checking Techniques in NLP: A Survey" vol. 2, Issue 12, Dec. 2012, International Journal of Advanced Research in Computer Science and Software Engineering.*

(Continued)

*Primary Examiner* — Stanley K Hill
*Assistant Examiner* — Thomas Fink
(74) *Attorney, Agent, or Firm* — Wilson Sonsini Goodrich & Rosati

(57) ABSTRACT

Disclosed are platforms, systems, media, and methods for implementing a methodological framework for automatically categorizing and summarizing emotions expressed in social chatter by using a "knowledge base" of emotional words/phrases as an input to define a distance metric between conversations and conducting hierarchical clustering based on the distance metric.

35 Claims, 2 Drawing Sheets

(56) References Cited

U.S. PATENT DOCUMENTS

| | | |
|---|---|---|
| 2007/0005654 A1 | 1/2007 | Schachar et al. |
| 2007/0067210 A1 | 3/2007 | Rishell et al. |
| 2007/0100779 A1 | 5/2007 | Levy et al. |
| 2007/0150335 A1 | 6/2007 | Arnett et al. |
| 2007/0174303 A1 | 7/2007 | Fleming et al. |
| 2007/0174386 A1 | 7/2007 | Loghmani |
| 2007/0214097 A1 | 9/2007 | Parsons et al. |
| 2008/0033776 A1 | 2/2008 | Marchese |
| 2008/0147487 A1 | 6/2008 | Hirshberg |
| 2008/0147620 A1 | 6/2008 | O'Malley |
| 2008/0147645 A1 | 6/2008 | O'Malley |
| 2008/0162400 A1 | 7/2008 | O'Malley |
| 2008/0229215 A1 | 9/2008 | Baron et al. |
| 2008/0249764 A1* | 10/2008 | Huang .............. G06F 17/2785 704/9 |
| 2009/0048904 A1 | 2/2009 | Newton et al. |
| 2009/0049127 A1 | 2/2009 | Juan et al. |
| 2009/0063557 A1* | 3/2009 | MacPherson ............ G06N 5/02 |
| 2009/0064017 A1 | 3/2009 | Biniak et al. |
| 2009/0119173 A1 | 5/2009 | Parsons et al. |
| 2009/0157668 A1 | 6/2009 | Newton et al. |
| 2009/0271370 A1 | 10/2009 | Jagadish et al. |
| 2009/0281851 A1 | 11/2009 | Newton et al. |
| 2009/0281988 A1 | 11/2009 | Yoo |
| 2010/0042910 A1 | 2/2010 | Manolescu et al. |
| 2010/0070485 A1 | 3/2010 | Parsons et al. |
| 2010/0076850 A1 | 3/2010 | Parekh et al. |
| 2010/0114702 A1 | 5/2010 | Wu et al. |
| 2010/0119053 A1* | 5/2010 | Goeldi .................... 379/265.09 |
| 2010/0131339 A1 | 5/2010 | Singh |
| 2010/0262477 A1 | 10/2010 | Hillerbrand et al. |
| 2010/0262498 A1 | 10/2010 | Nolet et al. |
| 2010/0268603 A1 | 10/2010 | Nolet et al. |
| 2010/0274815 A1 | 10/2010 | Vanasco |
| 2010/0306249 A1 | 12/2010 | Hill et al. |
| 2011/0035287 A1 | 2/2011 | Fox |
| 2011/0035594 A1 | 2/2011 | Fox |
| 2011/0040611 A1 | 2/2011 | Simmons et al. |
| 2011/0040612 A1 | 2/2011 | Simmons et al. |
| 2011/0040613 A1 | 2/2011 | Simmons et al. |
| 2011/0040635 A1 | 2/2011 | Simmons et al. |
| 2011/0040636 A1 | 2/2011 | Simmons et al. |
| 2011/0060994 A1 | 3/2011 | Maxwell et al. |
| 2011/0071900 A1 | 3/2011 | Kamath et al. |
| 2011/0112899 A1 | 5/2011 | Strutton et al. |
| 2011/0145064 A1 | 6/2011 | Anderson et al. |
| 2011/0173071 A1 | 7/2011 | Meyer et al. |
| 2011/0173264 A1 | 7/2011 | Kelly |
| 2011/0179114 A1 | 7/2011 | Dilip et al. |
| 2011/0185354 A1 | 7/2011 | Tanner et al. |
| 2011/0191417 A1 | 8/2011 | Rathod |
| 2011/0206198 A1* | 8/2011 | Freedman .............. G06Q 30/06 379/265.03 |
| 2011/0213670 A1 | 9/2011 | Strutton et al. |
| 2011/0231264 A1 | 9/2011 | Dilling et al. |
| 2011/0247031 A1 | 10/2011 | Jacoby |
| 2011/0258050 A1 | 10/2011 | Chan et al. |
| 2011/0264490 A1 | 10/2011 | Durvasula et al. |
| 2011/0264532 A1 | 10/2011 | Chan et al. |
| 2011/0264550 A1 | 10/2011 | Fair |
| 2011/0288907 A1 | 11/2011 | Harvey et al. |
| 2011/0288932 A1 | 11/2011 | Marks et al. |
| 2011/0296312 A1 | 12/2011 | Boyer et al. |
| 2011/0301941 A1 | 12/2011 | De Vocht |
| 2011/0302037 A1 | 12/2011 | Sutton-Shearer |
| 2011/0307307 A1 | 12/2011 | Benmbarek |
| 2011/0307340 A1 | 12/2011 | Benmbarek |
| 2011/0320300 A1 | 12/2011 | Broms et al. |
| 2011/0320395 A1 | 12/2011 | Dada et al. |
| 2012/0004956 A1 | 1/2012 | Huston et al. |
| 2012/0004983 A1 | 1/2012 | Borthwick et al. |

OTHER PUBLICATIONS

Gupta, Neha, et. al., "Spell Checking Techniques in NLP: A Survey" vol. 2, Issue 12, Dec. 2012, International Journal of Advanced Research in Computer Science and Software Engineering.*

COLLATEX, "Software for Collating Textual Sources", The Interedition Development Group, 2010.*

Paul E. Black, "Euclidean distance", in Dictionary of Algorithms and Data Structures [online], Vreda Pieterse and Paul E. Black, eds. Dec. 17, 2004. (accessed Dec. 1, 2015) Available from: http://www.nist.gov/dads/HTML/euclidndstnc.html.*

Using Multiple Sources to Construct a Sentiment Sensitive Thesaurus for Cross-Domain Sentiment Classification, by Bollegala, published 2011.*

* cited by examiner

AUTOMATED EMOTIONAL CLUSTERING OF SOCIAL MEDIA CONVERSATIONS

CROSS-REFERENCE TO RELATED APPLICATIONS

This application claims the benefit of U.S. Application Ser. No. 61/596,481, filed Feb. 8, 2012, which is hereby incorporated by reference in its entirety.

BACKGROUND OF THE INVENTION

With the rising popularity of social media (e.g., Twitter, Facebook, blogs), marketers and brand managers have become increasingly interested in understanding and monitoring how consumers perceive their brands and products through analyzing social media conversations. Given the massive amount of social media conversations (e.g., users post around 400 million short messages on Twitter per day), an automated methodology is needed to efficiently analyze and make sense of the content in social media conversations.

SUMMARY OF THE INVENTION

Current methods of analyzing social media conversations do not provide an automated system. With current technologies, the system requires an analyst to systematically code up a portion of social media conversation as training data before that method can provide any meaningful output.

The instant invention relates to a method and system for using methodological framework that allows one to automatically categorize and summarize the expressed emotions in social chatter by using a "knowledge base" of emotional words/phrases as an input to define a distance metric between conversations, and then conduct hierarchical clustering based on that distance metric.

An important feature of the present inventive subject matter as an unsupervised emotional clustering algorithm-based method and system is the ability to categorize the different kinds of emotions in social media conversation automatically, without the need of any human intervention. This is fundamentally different from current approaches which either rely partially on human input or provide analysis only at the simple word count level.

One advantage of completion automation is to eliminate costly and time-consuming work by a human analyst. Another advantage is that an automated system can be readily scaled. Another advantage is that scaling allows a system to handle data from various domains. Another advantage is that using data from various domains allows marketers to analyze social media content more efficiently. Another advantage is that an automated system avoids subject input from a human analyst, obtaining a large degree of objectivity in the data set and conclusions.

In one aspect, disclosed herein are computer-implemented systems for using methodological framework that allows one to automatically categorize and summarize the expressed emotions in social chatter by using a "knowledge base" of emotional words/phrases as an input to define a distance metric between conversations, then conducting hierarchical clustering based on that distance metric.

In another aspect, disclosed herein are computer-implemented methods for using methodological framework that allows one to automatically categorize and summarize the expressed emotions in social chatter by using a "knowledge base" of emotional words/phrases as an input to define a distance metric between conversations, then conducting hierarchical clustering based on that distance metric.

In another aspect, disclosed herein are computer-implemented real-time emotional monitoring systems for brands and companies, comprising computer hardware and software necessary for implementing the steps of obtaining real-time social media conversations, inputting said real-time social media conversations into a computer system having software that automatically categorizes and summarizes the expressed emotions in said real-time social media conversations by using a "knowledge base" of emotional words/phrases as an input, defining a distance metric between said real-time social media conversations, conducting hierarchical clustering based on that distance metric, and outputting a result.

In another aspect, disclosed herein are computer-implemented methods for real-time emotional monitoring system for brands and companies, comprising the steps of obtaining real-time social media conversations, inputting said real-time social media conversations into a computer system having software that automatically categorizes and summarizes the expressed emotions in said real-time social media conversations by using a "knowledge base" of emotional words/phrases as an input, defining a distance metric between said real-time social media conversations, conducting hierarchical clustering based on that distance metric, and outputting a result.

In another aspect, disclosed herein are non-transitory computer readable media for storing computer code for implementing the computerized methods disclosed herein.

In another aspect, disclosed herein are social media intelligence platforms comprising: a processor configured to provide an analyst application comprising: a database of tokens in a computer memory, the tokens comprising words or phrases expressing sentiment; a software module for building a matrix of relationships by identifying pairs of tokens and a sentiment distance associated with each pair; and a software module for organizing social media communications into sentiment clusters for a topic utilizing the tokens and relationships; the processor further configured to provide a customer dashboard application comprising: a software module for identifying a topic; and a software module for providing a graphic visualization of the sentiment clusters for the topic. In some embodiments, the social media comprises a blog, microblog, social network, podcast, wiki, content community, virtual world, or a combination thereof. In some embodiments, the database of tokens is domain-specific. In further embodiments, the domain is entertainment. In some embodiments, the tokens comprise words or phrases not expressing sentiment. In some embodiments, the analyst application further comprises a software module for associating equivalents with a token. In further embodiments, the equivalents comprise synonyms or misspellings. In some embodiments, the sentiment distance is selected from a similarity scale. In some embodiments, the analyst application further comprises a software module for calibrating tokens by assigning a valence and arousal score. In further embodiments, the valence and arousal scores are derived from a sample of social media communications containing the token. In some embodiments, the number of sentiment clusters is dynamically determined based on the content of the social media communications. In some embodiments, the graphic visualization of sentiment clusters comprises one or more prototypical communications associated with each cluster. In some embodiments, the customer dashboard application is offered as software-as-a-service.

In another aspect, disclosed herein are computer-implemented social media intelligence systems comprising: a digital processing device comprising an operating system configured to perform executable instructions and a memory device; a computer program including instructions executable by the digital processing device to create a social media intelligence application comprising: a database of tokens in a computer memory, the tokens comprising words or phrases expressing sentiment, the tokens associated pairwise into a matrix, each pair associated with a sentiment distance, each pair associated with a valence and arousal score; a software module for identifying tokens in a plurality of social media communications pertaining to a topic; a software module for organizing the social media communications into sentiment clusters for the topic utilizing the matrix; and a software module for providing a graphic visualization of the sentiment clusters for the topic. In some embodiments, the social media comprises a blog, microblog, social network, podcast, wiki, content community, virtual world, or a combination thereof. In some embodiments, the database of tokens is domain-specific. In further embodiments, the domain is entertainment. In some embodiments, the tokens comprise words or phrases not expressing sentiment. In some embodiments, at least one token is associated with at least one equivalent. In further embodiments, an equivalent comprises a synonym or a misspelling. In some embodiments, the sentiment distance is selected from a similarity scale. In some embodiments, the valence and arousal scores are derived from a sample of social media communications containing the token. In some embodiments, the number of sentiment clusters is dynamically determined based on the content of the social media communications. In some embodiments, the graphic visualization of sentiment clusters comprises one or more prototypical communications associated with each cluster.

In another aspect, disclosed herein are non-transitory computer-readable storage media encoded with a computer program including instructions executable by a processor to create a social media intelligence application comprising: a database of tokens in a computer memory, the tokens comprising words or phrases expressing sentiment, the tokens associated pairwise into a matrix, each pair associated with a sentiment distance, each pair associated with a valence and arousal score; a software module for identifying tokens in a plurality of social media communications pertaining to a topic; a software module for organizing the social media communications into sentiment clusters for the topic utilizing the matrix; and a software module for providing a graphic visualization of the sentiment clusters for the topic. In some embodiments, the social media comprises a blog, microblog, social network, podcast, wiki, content community, virtual world, or a combination thereof. In some embodiments, the database of tokens is domain-specific. In further embodiments, the domain is entertainment. In some embodiments, the tokens comprise words or phrases not expressing sentiment. In some embodiments, at least one token is associated with at least one equivalent. In further embodiments, an equivalent comprises a synonym or a misspelling. In some embodiments, the sentiment distance is selected from a similarity scale. In some embodiments, the valence and arousal scores are derived from a sample of social media communications containing the token. In some embodiments, the number of sentiment clusters is dynamically determined based on the content of the social media communications. In some embodiments, the graphic visualization of sentiment clusters comprises one or more prototypical communications associated with each cluster.

In one embodiment, there is provided a real-time emotional monitoring system for brands and companies using the methods and systems herein.

In another embodiment, there is provided a computer-implemented real-time emotional monitoring system for brands and companies, comprising computer hardware and software necessary for implementing the steps of obtaining real-time social media conversations, inputting said real-time social media conversations into a computer system having software that automatically categorizes and summarizes the expressed emotions in said real-time social media conversations by using a "knowledge base" of emotional words/phrases as an input, defining a distance metric between said real-time social media conversations, conducting hierarchical clustering based on that distance metric, and outputting a result.

In another embodiment, there is provided a computer-implemented method for real-time emotional monitoring system for brands and companies, comprising the steps of obtaining real-time social media conversations, inputting said real-time social media conversations into a computer system having software that automatically categorizes and summarizes the expressed emotions in said real-time social media conversations by using a "knowledge base" of emotional words/phrases as an input, defining a distance metric between said real-time social media conversations, conducting hierarchical clustering based on that distance metric, and outputting a result.

DETAILED DESCRIPTION OF THE INVENTION

Figure 1:
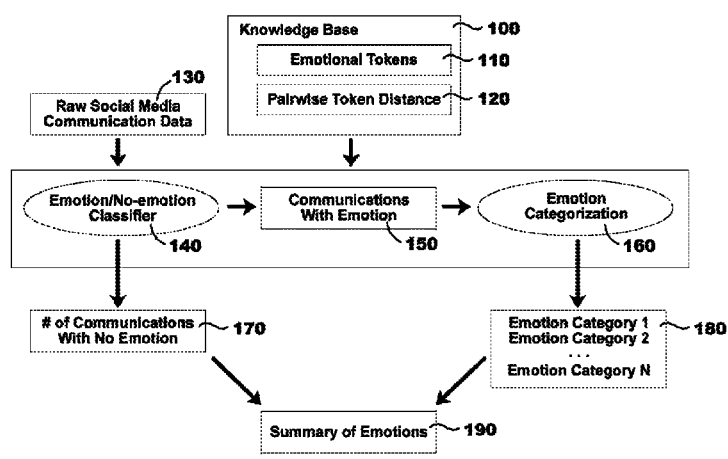
FIG. 1 shows a non-limiting exemplary overview of an embodiment of the present invention; in this case, an overview demonstrating a knowledge base comprising emotional tokens and a matrix of pairwise token relationships is used to summarize the emotions in raw social media communication data.

Described herein, in certain embodiments, are computer-implemented systems for using methodological framework that allows one to automatically categorize and summarize the expressed emotions in social chatter by using a "knowledge base" of emotional words/phrases as an input to define a distance metric between conversations, then conducting hierarchical clustering based on that distance metric.

Also described herein, in certain embodiments, are computer-implemented methods for using methodological framework that allows one to automatically categorize and summarize the expressed emotions in social chatter by using a "knowledge base" of emotional words/phrases as an input to define a distance metric between conversations, then conducting hierarchical clustering based on that distance metric.

Also described herein, in certain embodiments, are computer-implemented real-time emotional monitoring systems for brands and companies, comprising computer hardware and software necessary for implementing the steps of obtaining real-time social media conversations, inputting said real-time social media conversations into a computer system having software that automatically categorizes and summarizes the expressed emotions in said real-time social media conversations by using a "knowledge base" of emotional words/phrases as an input, defining a distance metric between said real-time social media conversations, conducting hierarchical clustering based on that distance metric, and outputting a result.

Also described herein, in certain embodiments, are computer-implemented methods for real-time emotional monitoring system for brands and companies, comprising the steps of obtaining real-time social media conversations, inputting said real-time social media conversations into a computer system having software that automatically categorizes and summarizes the expressed emotions in said real-time social media conversations by using a "knowledge base" of emotional words/phrases as an input, defining a distance metric between said real-time social media conversations, conducting hierarchical clustering based on that distance metric, and outputting a result.

Also described herein, in certain embodiments, are social media intelligence platforms comprising: a processor configured to provide an analyst application comprising: a database of tokens in a computer memory, the tokens comprising words or phrases expressing sentiment; a software module for building a matrix of relationships by identifying pairs of tokens and a sentiment distance associated with each pair; and a software module for organizing social media communications into sentiment clusters for a topic utilizing the tokens and relationships; the processor further configured to provide a customer dashboard application comprising: a software module for identifying a topic; and a software module for providing a graphic visualization of the sentiment clusters for the topic.

Also described herein, in certain embodiments, are computer-implemented social media intelligence systems comprising: a digital processing device comprising an operating system configured to perform executable instructions and a memory device; a computer program including instructions executable by the digital processing device to create a social media intelligence application comprising: a database of tokens in a computer memory, the tokens comprising words or phrases expressing sentiment, the tokens associated pairwise into a matrix, each pair associated with a sentiment distance, each pair associated with a valence and arousal score; a software module for identifying tokens in a plurality of social media communications pertaining to a topic; a software module for organizing the social media communications into sentiment clusters for the topic utilizing the matrix; and a software module for providing a graphic visualization of the sentiment clusters for the topic.

Also described herein, in certain embodiments, are non-transitory computer-readable storage media encoded with a computer program including instructions executable by a processor to create a social media intelligence application comprising: a database of tokens in a computer memory, the tokens comprising words or phrases expressing sentiment, the tokens associated pairwise into a matrix, each pair associated with a sentiment distance, each pair associated with a valence and arousal score; a software module for identifying tokens in a plurality of social media communications pertaining to a topic; a software module for organizing the social media communications into sentiment clusters for the topic utilizing the matrix; and a software module for providing a graphic visualization of the sentiment clusters for the topic.

Certain Definitions

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

Social Media Intelligence

As described herein, the use of social media is growing and social forums, platforms, networks, applications, and the like, have become pervasive and influential communications channels. Social media providers often provide APIs to allow authorized service providers to access the content of messages, posts, and other communications sent within their forums, platforms, networks, and applications. The sentiments, emotions, and opinions expressed therein are of vital interest to entities offering goods or services to the public as a source of consumer feedback. The platforms, systems, media, and methods described herein provide brand managers or other parties with insight and intelligence into sentiments, emotions, and opinions expressed in social media communications.

Many types of social media are suitable. In various embodiments, suitable social media include, by way of non-limiting examples, blogs, microblogs (e.g., Twitter, etc.), social networks (e.g., Facebook, LinkedIn, etc.), podcasts, wikis, content communities, virtual worlds (e.g., second life, etc.), massively multiplayer online games (also called MMOs and MMOGs), and the like.

Many types of social media communication are suitable. Suitable communications include those with text-based content and those from which text content is susceptible to extraction. Text communications such as blog posts, microblog posts, statuses, public and private messages, and the like are suitable. In some embodiments, text-based content is extracted from images, audio, video, metadata, tags, links, URLs, and the like.

In various embodiments, the claimed subject matter may be implemented as a method, apparatus, or article of manufacture using standard programming and/or engineering techniques to produce software, firmware, hardware, or any combination thereof to control a computer to implement the disclosed subject matter.

Disclosed herein are computer-based platforms. In some embodiments, a platform comprises one or more analyst applications. In further embodiments, an analyst application provides tools for a social media intelligence service provider to configure the infrastructure and perform the protocols described herein to analyze and monitor sentiments, emotions, and opinions expressed in social media. In some embodiments, a platform comprises one or more customer applications. In further embodiments, a customer application provides tools for a social media intelligence service subscriber to enter their topics of interest and view displays representing results of the analysis.

Also disclosed herein are computer-based systems. In some embodiments, a system provides one or more analyst applications described herein. In some embodiments, a system provides one or more customer applications described herein. In some embodiments, a system provides both the analyst applications and customer applications described herein.

Also disclosed herein are computer-readable instructions (e.g., computer programs, software applications, etc.) encoded onto non-transitory computer-readable media. In some embodiments, the instructions are executable to provide the platforms, systems, and applications described herein. Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Referring to FIG. 1, in a particular embodiment, a knowledge base 100 is constructed. In this embodiment, the knowledge base comprises a database of emotional tokens 110 and a pairwise distance between all of the major tokens and a subset of the minor tokens (determination of major/minor based on incidence in a sample) 120. Raw data representing social media communications 130 is obtained from a social media provider. Further in this embodiment, the raw data 130 is fed into a module that classifies each data as containing emotion or not containing emotion 140. Communications with no emotion are counted and number 170 is provided in a summary 190. Communications with emotion 150 are fed into a module for emotion categorization 160. The number of emotion categories is dynamically determined 180, communications are grouped based on category and provided to the summary 190.

Also disclosed herein are computer-implemented methods. In some embodiments, one or more steps of the method are performed by a particularly configured computing device. The methods described herein contemplate and encompass business methods. In some embodiments, the methods include those for analyzing and monitoring sentiments, emotions, and opinions expressed in social media communications. In some embodiments, the methods include those for providing a service for analyzing and monitoring sentiments, emotions, and opinions expressed in social media communications. In further embodiments, the methods include those for providing analysis and monitoring over time to measure changes or trends in the expressed sentiments, emotions, and opinions.

Knowledge Base

For a computer program to understand whether a certain word/phrase expresses emotions, an external "knowledge base" of emotional word/phrases is necessary (Manning and Schuetze 1999). The quality of the information contained in such knowledge base directly drives the performance of our emotional categorization system (Manning and Schuetze 1999).

In some embodiments, the platforms, systems, media, and methods described herein include a knowledge base, or use of the same. In further embodiments, a knowledge base comprises a list of emotional tokens and pairwise token distance.

In particular embodiments, a knowledge base K for emotional categorization is comprised of two key components K={V,D}. First, an exhaustive list of all emotional "tokens" under consideration is provided. In various embodiments, a token can be a single word, (e.g., "amazing"), a phrase, (e.g., "not blow away"), or a collection of words that carries a specific emotion, (e.g., "so far pretty good"). In a particular embodiment, this list is denoted as $V=\{v_1, v_2, \ldots, v_n\}$, where $v_i$ is an emotional token and n denotes the total number of emotional tokens considered. Thus, such a knowledge base allows the computer program to "tag" each communication based on the existence of emotional tokens in the communication. Note that n can be a very large number, thus the construction of such knowledge bases may be extremely costly. However, recent success to construct a large lexical database for English (see, e.g., the WordNet database described in Fellbaum (2005)) shows that such a task is possible, albeit time consuming.

In some embodiments, the platforms, systems, media, and methods described herein include a database of tokens, or use of the same. A database of tokens described herein has many suitable sizes. In various embodiments, a database of tokens described herein includes about 50, about 100, about 200, about 300, about 400, about 500, about 600, about 700, about 800, about 900, about 1000 or more tokens. In further various embodiments, a database of tokens described herein includes about 1000, about 2000, about 3000, about 4000, about 5000, about 6000, about 7000, about 8000, about 9000, about 10000 or more tokens. In various embodiments, a database of tokens described herein includes at least 50, at least 100, at least 200, at least 300, at least 400, at least 500, at least 600, at least 700, at least 800, at least 900, at least 1000, at least 2000, at least 3000, at least 4000, at least 5000, at least 6000, at least 7000, at least 8000, at least 9000, at least 10000 or more tokens.

In some embodiments, tokens are identified manually by one or more analysts. In some embodiments, tokens in a database of tokens are ranked, scored, or rated based on incidence in a calibration sample. In a further embodiment, tokens in a database of tokens are ranked into two or more groups based on incidence. In a particular embodiment, tokens are ranked as major or minor tokens. In some embodiments, tokens are associated with equivalents. In further embodiments, token equivalents include, by way of non-limiting examples, synonyms, misspellings, slang, abbreviations, foreign language alternatives, and the like.

In some embodiments, a database of tokens is language specific and intended for analysis of social media communications expressed in a particular language or group of related/similar languages. Many languages are suitable. In various embodiments, suitable languages include, by way of non-limiting examples, English, Spanish, Italian, Portuguese, French, Dutch, Polish, German, Russian, Ukrainian, Mandarin, Wu, Cantonese, Hindi, Punjabi, Bengali, Marathi, Urdu, Arabic, Turkish, Tamil, Farsi, Japanese, Korean, Vietnamese, Thai, Burmese, Malay, Telugu, Javanese, and Tagalog. In a particular embodiment, the tokens are English tokens.

In some embodiments, a database of tokens is domain specific and intended for analysis of social media communications pertaining to a particular subject matter. Many domains are suitable. Any domain for which consumers express sentiment in social media is suitable. In various embodiments, suitable domains include, by way of non-limiting examples, entertainment (e.g., movies, television, books, magazines, music, video games, etc.), sports (e.g., college, professional, Olympic, etc.), fashion, travel, politics (e.g., local, state, national, etc.), news, technology, shopping, and the like.

In some embodiments, one or more tokens in a database of tokens are assigned an arousal score. In some embodiments, all of the tokens in a database of tokens are assigned an arousal score. In further embodiments, an arousal score represents the degree of emotional activation or deactivation expressed by the token. Many scoring, rating, or ranking regimes are suitable, including by way of non-limiting examples, numeric scores, letter grades, and the like.

In some embodiments, one or more tokens in a database of tokens are assigned a valence score. In some embodiments, all of the tokens in a database of tokens are assigned a valence score. In further embodiments, a valence score represents the degree of positivity or negativity expressed by the token. Many scoring, rating, or ranking regimes are suitable, including by way of non-limiting examples, numeric scores, letter grades, and the like.

In further particular embodiments, the second component of the knowledge base is a specification of the pairwise "similarity" between any two emotional tokens. This allows a computer system to later compute an "emotional similarity" between any two social media communications, a pre-requisite for a full hierarchical clustering of communications based on their emotional content (Johnson and Wichern 2007).

In some embodiments, the platforms, systems, media, and methods described herein include a software module for building and maintaining a matrix of pairwise relationships between pairs of tokens, or use of the same. In some embodiments, a matrix of pairwise relationships between tokens described herein includes every possible pair of tokens available in a database of tokens. In other embodiments, a matrix of pairwise relationships between tokens described herein includes a subset of the possible pairs of tokens available in a database of tokens.

In some embodiments, each pairwise relationship between tokens in a matrix of relationships includes a degree of similarity for each token pair. In further embodiments, a degree of similarity spans a range from positive similarity to negative similarity (e.g., dissimilarity). In still further embodiments, a degree of similarity is expressed on a scale. Many scales are suitable including, by way of non-limiting examples, numeric scales, letter grades, qualitative scales, and the like.

In some embodiments, a matrix of pairwise relationships between tokens described herein is generated manually by one or more analysts. In some embodiments, each pairwise relationship in the matrix of relationships, including the degree of similarity is validated by one or more additional analysts. In further embodiments, validation is performed by voting. In still further embodiments, validation is performed by voting "agree" or "disagree" with each configured token relationship.

In certain embodiments, pairwise similarity between any two tokens ($s_{v_i, v_j}$) is rated on a scale of −3 (strongly opposite), −2 (moderately opposite), −1 (weakly opposite), 0 (no relationship), 1 (weakly synonymous), 2 (moderately synonymous), and 3 (strongly synonymous). For example, the pairwise similarity between "dull" and "fascinated" is −3; the pairwise similarity between "fantastic" and "exquisite" is +3. Based on this pairwise similarity, we define a (symmetric) distance matrix $D_{n \times n}$, where $$D_{ij(i \neq j)} = 4 - s_{v_i v_j} \quad \text{Formula 1}$$

with the diagonal entires of D equals 0. Thus, in this embodiment, the "distance" between any two tokens ranges from 0 to 7, distance=0 if two tokens are the same, and distance=7 if the two tokens carry strongly opposite emotions.

In some embodiments, social media communications are classified as either emotional or non-emotional communications. Given the knowledge base of emotional tokens (K), in light of the disclosure provided herein, it is straightforward to determine whether a social media communication carries emotions or not. The collection of communications is denoted as $x_k$ (k=1, 2, ..., K). For any communication, the words contained in the communications are compared with the set of emotional tokens (V). Formally, each communication $x_k$ is represented by the set of tokens that belong in V, which we denote by the vector $\vec{z}_k$. The absence of any emotional tokens in a communication (i.e., $\vec{z}_k = \{\phi\}$) put the communication into the "communications with no emotions" category. The remaining communications (which are classified as "communications with emotions") are then clustered based on their emotional content, using the methodology discussed herein.

In some embodiments, expressed emotions are categorized. In order to cluster communications based on their emotional content, a "distance metric" is first defined between any two communications, which may contain a different number of emotional tokens. For ease of exposition, two communications are denoted as $x_k$ and $x_l$, and the distance function between them is denoted as $d(x_k, x_l)$. Provided herein is the definition of $d(x_k, x_l)$ and examples to illustrate the distance metric. Also provided herein is a standard hierarchical clustering algorithm, based on $d(x_k, x_l)$ In some embodiments, a distance metric utilizes an expand-align-compare (EAC) algorithm. Given that $x_k$ and $x_l$ may contain a different number of emotional tokens, the following "expand-align-compare" (EAC) algorithm is utilized to define the distance between any two communications, which are now summarized by their (respective) collections of emotional tokens. The intuition of the described approach is as follows. First, if the two sequences of emotional tokens (extracted from the two communications, respectively) differ in length, the shorter sequence is "expanded" by making replicates of itself to match the length of the longer sequence. Next, the two sequences (now of equal lengths) are "aligned": i.e., the emotional tokens are ordered so that they are maximally similar to each other in each position. Finally, the emotional tokens in each position are "compared" based on the pairwise token distance (D) defined in the knowledge base (described herein), and the distance between two communications is taken as the average of all the pairwise token distances.

The EAC algorithm is formally defined as follows. As discussed, the sequence of emotional tokens extracted from communication $x_k$ and communication $x_l$ are denoted as $\vec{z}_k$ and $\vec{z}_l$, respectively. Without loss of generality, we assume that the length of the sequence $\vec{z}_k$ (henceforth denoted as $|\vec{z}_k|$) is shorter or equal to the length of $\vec{z}_l$. Alternatively, one computes $d(x_l, x_k)$ instead, assuming that the distance metric is symmetric. It is denoted that $\tilde{z}_k^{(t)}$ (t=1, 2, ..., T) as the "expanded" versions of $\vec{z}_k$, by making replicates of itself to matches the length of $\vec{z}_l$. Thus, if $|\vec{z}_l|$ is a multiple of $|\vec{z}_k|$ (e.g., $\vec{z}_k = \{a,b\}$, $\vec{z}_l = \{c,d,e,f\}$) and there should only be one version of $\tilde{z}_k^{(t)}$ ($\{a,b,a,b\}$ in this example), hence T=1. Otherwise, if $|\vec{z}_l|$ is a not multiple of $|\vec{z}_k|$ (e.g., $\vec{z}_k = \{a,b\}$, $\vec{z}_l = \{c,d,e,\}$), $\tilde{z}_k^{(t)}$) should carry more than one "expanded" version ($\{a,b,a\}$, or $\{a,b,b\}$). In general, if we let q=floor($|\vec{z}_l|/|\vec{z}_k|$), there should be T=$_{|\vec{z}_k|}C_{|\vec{z}_l|-q|\vec{z}_k|}$ versions of $\tilde{z}_k^{(t)}$, to represent all the possible "expansions" of $\vec{z}_k$.

Next, the distance metric between communication $x_k$ and communication $x_l$ is defined as the average "aligned" distance (defined later) between $\tilde{z}_k^{(t)}$ and $\vec{z}_l$. That is:

$$d(x_k, x_l) \equiv \frac{1}{T} \sum_{t=1}^{T} d^*(\tilde{z}_k^{(t)}, \vec{z}_l) \quad \text{Formula 2}$$

where $d^*(\vec{z}_{l_1}, \vec{z}_{l_2})$ denotes the "aligned" distance between the sequence of emotional tokens $\vec{z}_{l_1}$ and $\vec{z}_{l_2}$ (which are assumed to be equal in length). $d^*(\vec{z}_{l_1}, \vec{z}_{l_2})$ can be computed by looking at every possible permutation of $\vec{z}_{l_2}$ and selecting the one that has the smallest average pairwise distance with $\vec{z}_{l_1}$. Formally, we define:

$$d^*(\vec{z}_{l_1}, \vec{z}_{l_2}) \equiv \min_{\vec{z}'_{l_2} \in P(\vec{z}_{l_2})} \left( \frac{1}{|\vec{z}_{l_2}|} \sum_{i=1}^{|\vec{z}_{l_2}|} D(z_{l_1 i}, z'_{l_2 i}) \right) \quad \text{Formula 3}$$

where $\vec{z}'_{l_2}$ denotes a permuted version of $\vec{z}_{l_2}$, and $z'_{l_2 i}$ denotes the i-th element of $\vec{z}_{l_2}$. Thus, Formula 2 and Formula 3 fully define an "emotional distance metric" between any two communications which may consist of different number of emotional tokens.

In some embodiments, communications are hierarchically clustered. Given the definition of an "emotional distance metric," clustering communications based on their emotions is straightforward and can be done using a variety of standard clustering algorithms (e.g., John and Wichern 2007). Here, we outline the procedure of agglomerative hierarchical clustering with average linkage; it is clear that other clustering methods (e.g., k-means clustering, k-mediod clustering) can be directly applied here as well.

In some embodiments, the agglomerative hierarchical clustering algorithm produces a series of partitions of the data using the following steps (please refer to Johnson and Wichern 2007 for details):

(1) Initially, each communication is its own cluster.

(2) At each particular stage, we join together the two clusters which are "most similar", where distance between any two cluster A and B are measured by $$\text{Cluster-Distance}(A, B) = \sum_a \sum_b D(a, b) / (|A| * |B|) \quad \text{Formula 4}$$

where a, b, denotes elements of cluster A and B, respectively, and |A| and |B| denotes the number of elements in cluster A and B, respectively.

In some embodiments, the platforms, systems, media, and methods described herein include a software module for providing a visualization of sentiment clusters, or use of the same. In further embodiments, a software module for providing a visualization of sentiment clusters is part of a customer dashboard application and provides customers of a social intelligence service to monitor sentiment expressed in social media for any particular topic.

In some embodiments, a visualization of sentiment clusters described herein is a textual visualization. In other embodiments, a visualization of sentiment clusters described herein is a graphical visualization. Many graphic visualization formats are suitable. In various embodiments, suitable graphic visualization formats include, by way of non-limiting examples, charts, graphs, maps, diagrams, and the like.

In some embodiments, the individual elements of a graphic visualization represent sentiment clusters for a topic. In further embodiments, an individual element indicates the magnitude (e.g., number of communications in the cluster, etc.) of a sentiment cluster. In further embodiments, an individual element indicates the arousal (e.g., degree of emotional activation or deactivation) associated with a sentiment cluster. In further embodiments, an individual element indicates the valence (e.g., degree of positively or negativity) associated with a sentiment cluster. In some embodiments, an individual element indicates one or more representative social media communications associated with a sentiment cluster.

In some embodiments, the visualization is hierarchical indicating the relationships between sentiment clusters. In some embodiments, the visualization is interactive. In further embodiments, interactivity is utilized to allow a customer to expand and/or collapse hierarchies of sentiment clusters in order to get different views of the data contained therein. In further embodiments, interactivity is utilized to allow a customer to move, manipulate, tag, label, or organize sentiment clusters in order to make better use of the data contained therein. In some embodiments, clusters are optionally interacted with to provide one or more social media communications representative of those in the cluster.

In some embodiments, a graphic visualization of sentiment clusters described herein is two-dimensional. In other embodiments, a graphic visualization of sentiment clusters described herein is three-dimensional.

Figure 2:
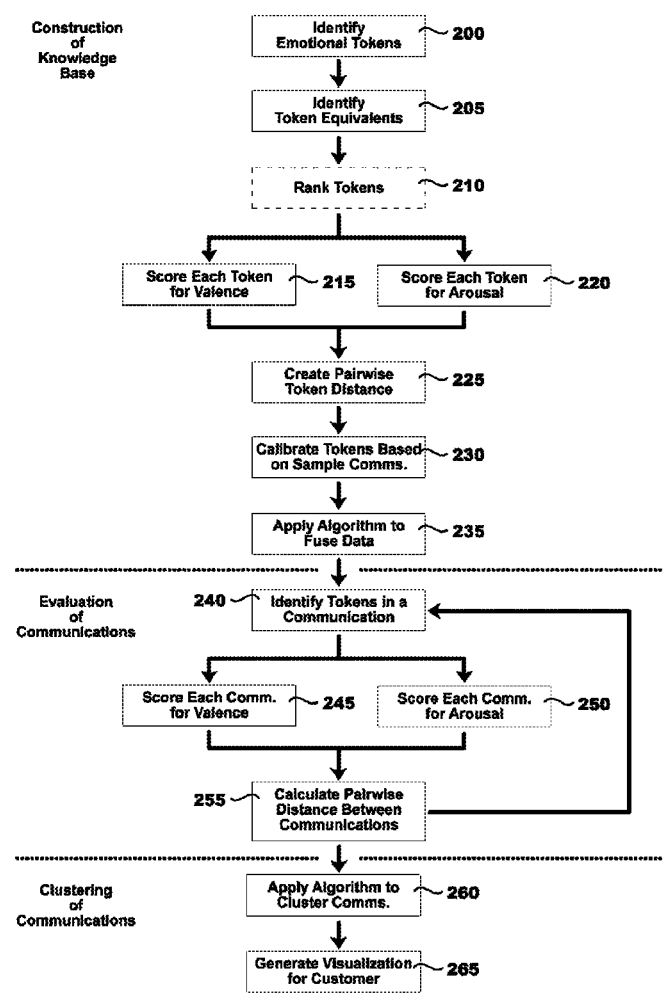
FIG. 2 shows a non-limiting exemplary process flow; in this case, a process for analyzing raw social media communications to provide a display of sentiment clusters.

Referring to FIG. 2, in a particular embodiment, an overall social media intelligence monitoring process includes three phases: 1) construction of a knowledge base; 2) use of the knowledge base to evaluate the sentiments of social media communications; and 3) clustering of communications to provide a summary for a customer. In this embodiment, a group of analysts uses a large sample of social media communications pertaining to a particular topic to identify a set of domain specific emotional tokens (e.g., words or phrases expressing sentiment, emotion, etc.) 200. The analysts further identify equivalents for each token 205. Optionally, the tokens are ranked 210 based on their frequency of incidence in the sample of communications (i.e., into major and minor groups). Further in this embodiment, each token is assigned a valence score 215 and an arousal score 220 to qualify the expressed emotion in terms of strength and direction.

Continuing to refer to FIG. 2, in a particular embodiment, the analysts then manually rate the similarity of each possible pair of tokens to create a pairwise token distance 225. These configurations are calibrated 230 by evaluating a sample of social media communications for each token. For each sample communication, the valence and arousal is rated and evaluated. Finally, the knowledge based is completed by fusing the pairwise distancing data and the calibration data with a data fusion algorithm 235. This procedure refines the matrix of pairwise tokens distances through a signal processing approach, and at the same time, approximates missing entries.

Continuing to refer to FIG. 2, in a particular embodiment, the completed knowledge base is utilized in an iterative process to evaluate the expressed emotions in a plurality of social media communications in order to create a clustered summary of expressed emotions. In this embodiment, for each communication, the emotional tokens are identified 240. It should be noted that a single communication, in various cases, includes none, one, or a plurality of tokens. Further in this embodiment, using the valence and arousal scores of each token in the knowledge base, each communication is assigned a valence score 245 and an arousal score 250. Given the pairwise distance between tokens in the knowledge base, an algorithm is applied to compute the pairwise distance between communications 255 in the data set. Next, given the pairwise distance between communications, a clustering algorithm is applied to cluster the communications into different emotional clusters 260. The number of clusters is dynamically determined. Last, a visual summary of sentiment clusters is generated 265 in a graphical format and presented to a customer via a dashboard application.

REFERENCES

Fellbaum, Christiane (2005), "WordNet and wordnets," in Brown, Keith et al. (Eds.), Encyclopedia of Language and Linguistics, 2nd Edition, Oxford.

Hopkins, Daniel, and Gary King (2010), "A Method for Automated Nonparametric Content Analysis for Social Science," American Journal of Political Science, 54, 229-247.

Johnson, Richard A., and Dean W. Wichern (2007), Applied Multivariate Statistical Analysis, 6th Edition, Prentice Hall.

Manning, Christopher, and Hinrich Schuetze (1999), Foundations of Statistical Natural Language Processing, MIT Press.

The references recited herein are incorporated herein in their entirety, particularly as they relate to teaching the level of ordinary skill in this art and for any disclosure necessary for the commoner understanding of the subject matter of the claimed invention.

Digital Processing Device

In some embodiments, the platforms, systems, media, and methods described herein include a digital processing device, or use of the same. In further embodiments, the digital processing device includes one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera to capture motion or visual input. In still further embodiments, the input device is a combination of devices such as those disclosed herein.

Non-Transitory Computer Readable Storage Medium

In some embodiments, the platforms, systems, media, and methods disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

The term "article of manufacture" as used herein is intended to encompass a computer program accessible from any computer-readable device or media. Of course, those skilled in the art will recognize many modifications may be made to this configuration without departing from the scope or spirit of the claimed subject matter.

Computer Program

In some embodiments, the platforms, systems, media, and methods disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of information associated with social media communications, tokens, token relationships, sentiment distances, valence scores, arousal scores, or sentiment clusters. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

EXAMPLES

The following illustrative examples are representative of embodiments of the software applications, systems, and methods described herein and are not meant to be limiting in any way. Described herein are five examples to further illustrate suitable distance metrics. Note that in the examples below, (a, b, c, d, e, f) denotes six different emotional tokens in V, i.e., a,b,c,d,e,f∈V.

Example 1

$\vec{z}_k = \{a\}; \vec{z}_l = \{b\}$.

In this case, clearly $d(x_k, x_l) = D(a,b)$. Since each communication contains only a single emotional token, the "expand" or "align" steps of the EAC algorithm described herein are not necessary.

Example 2

$\vec{z}_k = \{a\}; \vec{z}_l = \{b,c,d\}$.

To compute $d(x_k, x_l)$, we first expand $\vec{z}_k = \{a\}$ to match the length of $\vec{z}_l$. Because $|\vec{z}_l|$ is a multiple of $|\vec{z}_k|$, we have T=1 and $\tilde{z}_k^{(l)} = \{a,a,a\}$. Thus, we have $$d(x_k, x_l) = \frac{1}{3}(D(a, b) + D(a, c) + D(a, d)).$$

Example 3

$\vec{z}_k = \{a,b\}; \vec{z}_l = \{c,d\}$.

Here $\vec{z}_k$ and $\vec{z}_l$ have the same length, so the "expand" step is not needed. To compute the "aligned" distance, we consider the two possible orderings of $\vec{z}_l$: {c,d} and {d,c}, and take the ordering that gives the smallest distance with $\vec{z}_k$. Thus, we have $$d(x_k, x_l) = \frac{1}{2}\min\{(D(a, c) + D(b, d)), (D(a, d) + D(b, c))\}.$$

Example 4

$\vec{z}_k = \{a,b\}; \vec{z}_l = \{c,d,e,f\}$.

In this case both the "expand" and "align" steps of the EAC algorithm described herein are needed. We first expand $\vec{z}_k = \{a,b\}$ to match the length of $\vec{z}_l$. Because $|z_l|$ is a multiple of $|\vec{z}_k|$, we have T=1 and $\tilde{z}_k^{(l)} = \{a,b,a,b\}$. Next, we consider all possible ordering of $\vec{z}_l$. Because $|\vec{z}_l|=4$, there are a total of 4!=24 permutations:

{e,d,e,f}, {c,d,f,e}, {c,e,d,f}, {c,e,f,d}, {c,f,d,e}, {c,f,e,d},

{d,c,e,f}, {d,c,f,e}, {d,e,c,f}, {d,e,f,c}, {d,f,c,e}, {d,f,e,c},

{e,c,d,f}, {e,c,f,d}, {e,d,c,f}, {e,d,f,c}, {e,f,c,d}, {e,f,d,c},

{f,c,d,e}, {f,c,e,d}, {f,d,c,e}, {f,d,e,c}, {f,e,c,d}, {f,e,c,d}.

$d(x_k, x_l)$ can then be computed by computing each of the distance of the 24 permutations of with $\vec{z}_l$ with $\tilde{z}_k^{(1)}$, and taking the minimum of those distances.

Example 5

$$\vec{z}_k=\{a,b\}; \vec{z}_l=\{c,d,e\}.$$

Finally, consider the case where $|\vec{z}_l|$ is not an exact multiple of $|\vec{z}_k|$. In this case, we need to consider two possible expansions of $\vec{z}_k=\{a,b\}$. That is, T=2, with $\tilde{z}_k^{(1)}=\{a,b,a\}$ and $\tilde{z}_k^{(2)}=\{a,b,b\}$. Then, we consider the 6 possible permutations of $\vec{z}_l$: {c,d,e}, {c,e,d}, {d,c,e}, {d,e,c}, {e,c,d}, and {e,d,c}.

The aligned distance between $\vec{z}_l$ and $\tilde{z}_k^{(1)}$ is defined as:

$$d^*(\tilde{z}_k^{(1)}, \vec{z}_l) = \frac{1}{3}\min\begin{pmatrix} D(a,c)+D(b,d)+D(a,e) \\ D(a,c)+D(b,e)+D(a,d) \\ D(a,d)+D(b,c)+D(a,e) \\ D(a,d)+D(b,e)+D(a,c) \\ D(a,e)+D(b,c)+D(a,d) \\ D(a,e)+D(b,d)+D(a,c) \end{pmatrix}$$

Similarly, the aligned distance between $\vec{z}_l$ and $\tilde{z}_k^{(2)}$ is defined as:

$$d^*(\tilde{z}_k^{(2)}, \vec{z}_l) = \frac{1}{3}\min\begin{pmatrix} D(a,c)+D(b,d)+D(b,e) \\ D(a,c)+D(b,e)+D(b,d) \\ D(a,d)+D(b,c)+D(b,e) \\ D(a,d)+D(b,e)+D(b,c) \\ D(a,e)+D(b,c)+D(b,d) \\ D(a,e)+D(b,d)+D(b,c) \end{pmatrix}.$$

Finally, per Formula 2, $$d(x_k, x_l) = \frac{1}{2}\left(d^*(\tilde{z}_k^{(1)}, \vec{z}_l) + d^*(\tilde{z}_k^{(2)}, \vec{z}_l)\right).$$

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

The invention claimed is:

1. A computer-implemented real-time, emotional-monitoring system for brands and companies, comprising a computer system comprising hardware and software, said computer system implementing the steps of obtaining real-time social media conversations, inputting said real-time social media conversations into the computer system, wherein the software automatically classifies, categorizes and summarizes expressed emotions in said real-time social media conversations by using a knowledge base of emotional words, or phrases, or both words and phrases as an input, wherein the knowledge base comprises a list of emotional tokens and pairwise token distance using a degree of similarity, each pair associated with a valence and arousal score expressed on a scale, defining a continuous distance metric between said real-time social media conversations comprising same or different number of the emotional tokens utilizing an expand-align-compare (EAC) algorithm, conducting hierarchical clustering based on that distance metric, and outputting a result associated with said hierarchical clustering.

2. A computer-implemented method for real-time, emotional-monitoring system for brands and companies, comprising the steps of obtaining real-time social media conversations, inputting said real-time social media conversations into a computer system comprising software that automatically classifies, categorizes and summarizes expressed emotions in said real-time social media conversations by using a knowledge base of emotional words, or phrases, or both words and phrases as an input, wherein the knowledge base comprises a list of emotional tokens and pairwise token distance using a degree of similarity, each pair associated with a valence and arousal score expressed on a scale, defining a continuous distance metric between said real-time social media conversations comprising same or different number of the emotional tokens utilizing an expand-align-compare (EAC) algorithm, conducting hierarchical clustering based on that distance metric, and outputting a result associated with said hierarchical clustering.

3. Non-transitory computer readable media storing computer code that, when executed, performs the computer-implemented method of claim 2.

4. A social media intelligence platform comprising:
   a. a processor providing an analyst application comprising:
      i. a first software module obtaining real-time social media conversations;
      ii. a second software module automatically classifying, categorizing and summarizing expressed emotions in said real-time social media conversations by using a knowledge base of emotional words, or phrases, or both words and phrases as an input, wherein the knowledge base comprises a list of emotional tokens and pairwise token distance using a degree of similarity, each pair associated with a valence and arousal score expressed on a scale;
      iii. a third software module defining a continuous distance metric between said real-time social media conversations comprising same or different number of the emotional tokens utilizing an expand-align-compare (EAC) algorithm; and
      iv. a fourth software module conducting clustering based on that distance metric;
   b. the processor further providing a customer dashboard application comprising:
      i. a fifth software module providing an interface allowing the customer to input a topic; and
      ii. a sixth software module providing a graphic visualization of the sentiment clusters for the topic.

5. The platform of claim 4, wherein the social media comprises a blog, microblog, social network, podcast, wiki, content community, virtual world, or a combination thereof.

6. The platform of claim 4, wherein the knowledge base is domain-specific.

7. The platform of claim 6, wherein the domain is entertainment.

8. The platform of claim 4, wherein the knowledge base further comprises words or phrases not expressing sentiment.

9. The platform of claim 4, wherein the analyst application further comprises a software module associating equivalents with at least one of the tokens.

10. The platform of claim 9, wherein the equivalents comprise synonyms or misspellings.

11. The platform of claim 4, wherein the analyst application further comprises a software module calibrating the tokens by assigning a valence and arousal score.

12. The platform of claim 11, wherein the valence and arousal scores are derived from a sample of social media communications containing at least one of the tokens.

13. The platform of claim 4, wherein the number of sentiment clusters is dynamically determined based on the content of the social media communications.

14. The platform of claim 4, wherein the graphic visualization of sentiment clusters comprises one or more prototypical communications associated with each cluster.

15. The platform of claim 4, wherein the customer dashboard application is offered as software-as-a-service.

16. A computer-implemented social media intelligence system comprising:
   a. a digital processor performing a computer program comprising executable instructions stored on a memory device;
   b. the computer program providing a social media intelligence application comprising:
      i. a first software module obtaining real-time social media conversations;
      ii. a second software module automatically classifying, categorizing and summarizing expressed emotions in said real-time social media conversations by using a knowledge base of emotional words, or phrases, or both words and phrases as an input, wherein the knowledge base comprises a list of emotional tokens and pairwise token distance using a degree of similarity, each pair associated with a valence and arousal score expressed on a scale;
      iii. a third software module defining a continuous distance metric between said real-time social media conversations comprising same or different number of the emotional tokens utilizing an expand-align-compare (EAC) algorithm;
      iv. a fourth software module conducting hierarchical clustering based on that distance metric; and
      vi. a fifth software module outputting a result associated with said hierarchical clustering.

17. The system of claim 16, wherein the social media comprises a blog, microblog, social network, podcast, wiki, content community, virtual world, or a combination thereof.

18. The system of claim 16, wherein the knowledge base is domain-specific.

19. The system of claim 18, wherein the domain is entertainment.

20. The system of claim 16, wherein the knowledge base further comprises words or phrases not expressing sentiment.

21. The system of claim 16, wherein at least one of the tokens is associated with at least one equivalent.

22. The system of claim 21, wherein an equivalent comprises a synonym or a misspelling.

23. The system of claim 16, wherein the valence and arousal scores are derived from a sample of social media communications containing at least one of the tokens.

24. The system of claim 16, wherein the number of clusters is dynamically determined based on the content of the social media communications.

25. The system of claim 16, wherein the result comprises a graphic visualization of the clusters.

26. Non-transitory computer-readable storage media encoded with a computer program including instructions executable by a processor to provide a social media intelligence application comprising:
   a. a first software module obtaining real-time social media conversations;
   b. a second software module automatically classifying, categorizing and summarizing expressed emotions in said real-time social media conversations by using a knowledge base of emotional words, or phrases, or both words and phrases as an input, wherein the knowledge base comprises a list of emotional tokens and pairwise token distance using a degree of similarity, each pair associated with a valence and arousal score expressed on a scale;
   c. a third software module defining a continuous distance metric between said real-time social media conversations comprising same or different number of the emotional tokens utilizing an expand-align-compare (EAC) algorithm;
   d. a fourth software module conducting hierarchical clustering based on that distance metric; and
   e. a fifth software module outputting a result associated with said hierarchical clustering.

27. The media of claim 26, wherein the social media comprises a blog, microblog, social network, podcast, wiki, content community, virtual world, or a combination thereof.

28. The media of claim 26, wherein the knowledge base is domain-specific.

29. The media of claim 28, wherein the domain is entertainment.

30. The media of claim 26, wherein the knowledge base further comprises words or phrases not expressing sentiment.

31. The media of claim 26, wherein at least one of the tokens is associated with at least one equivalent.

32. The media of claim 31, wherein an equivalent comprises a synonym or a misspelling.

33. The media of claim 26, wherein the valence and arousal scores are derived from a sample of social media communications containing at least one of the tokens.

34. The media of claim 26, wherein the number of clusters is dynamically determined based on the content of the social media communications.

35. The media of claim 26, wherein the result comprises a graphic visualization of the clusters.

* * * * *